United States Patent
Minarik

[19]

[11] Patent Number: 6,018,644
[45] Date of Patent: Jan. 25, 2000

[54] LOW-LOSS, FAULT-TOLERANT ANTENNA INTERFACE UNIT

[75] Inventor: Ronald W. Minarik, Lutherville, Md.

[73] Assignee: Northrop Grumman Corporation, Los Angeles, Calif.

[21] Appl. No.: 08/789,770

[22] Filed: Jan. 28, 1997

[51] Int. Cl.[7] .................................................. H04J 3/02
[52] U.S. Cl. .............................. 455/82; 455/8; 455/561
[58] Field of Search ................................ 455/78, 82, 83, 455/103, 129, 127, 561, 562, 8, 9, 20

[56] References Cited

U.S. PATENT DOCUMENTS

| | | | |
|---|---|---|---|
| 5,287,543 | 2/1994 | Wolkstein | 455/103 |
| 5,302,914 | 4/1994 | Arntz et al. | 455/103 |
| 5,321,690 | 6/1994 | Sato | 455/561 |
| 5,430,789 | 7/1995 | Ohgami | 455/561 |
| 5,548,583 | 8/1996 | Bustamante | 455/561 |
| 5,584,058 | 12/1996 | Arnold | 455/103 |
| 5,689,219 | 11/1997 | Piirainen | 455/103 |
| 5,768,691 | 6/1998 | Matero et al. | 455/78 |
| 5,809,405 | 9/1998 | Yamaura | 455/82 |

*Primary Examiner*—Edward F. Urban
*Assistant Examiner*—Thuan T. Nguyen
*Attorney, Agent, or Firm*—Walter G. Sutcliff

[57] ABSTRACT

An antenna interface unit (AIU) for providing low power loss, fault tolerant connectivity between multiple transmitters and an antenna, and between multiple receivers and the antenna. The antenna interface unit also eliminates single point failures in a transmit/receive (T/R) mechanism. The antenna interface unit includes (a) a power combiner/splitter connectable to the antenna; a receive channel connected to the power combiner/splitter; and a transmit channel connected to the power combiner/splitter. The transmit channel is a different channel from the receive channel. The receivers are connectable to the antenna via the receive channel and through the power combiner/splitter. The transmitters are connectable to the antenna via the transmit channel and through the power combiner/splitter. Different variations of the receive channel and the transmit channel are provided by using different combinations of power combiners and power splitters.

18 Claims, 6 Drawing Sheets

LOW-LOSS, FAULT-TOLERANT ANTENNA INTERFACE UNIT

CROSS REFERENCE TO RELATED APPLICATIONS

This application is related to U.S. Applications entitled DIGITALLY PROGRAMMABLE MULTIFUNCTION RADIO SYSTEM ARCHITECTURE, having U.S. Ser. No. 08/522,050 and COMMON RECEIVE MODULE FOR A PROGRAMMABLE DIGITAL RADIO, having U.S. Ser. No. 08/528,206 (now U.S. Pat. No. 5,859,878); COMMON TRANSMIT MODULE FOR A PROGRAMMABLE DIGITAL RADIO, having U.S. Ser. No. 08/522,058 (now U.S. Pat. No. 5,867,535); DIGITALLY PROGRAMMABLE RADIO MODULES FOR TRANSPONDER SYSTEMS, having U.S. Ser. No. 08/522,059 (now U.S. Pat. No. 5,712,628); and WIDE BAND RADIO-FREQUENCY CONVERTER HAVING MULTIPLE USE OF INTERMEDIATE FREQUENCY TRANSLATORS, having U.S. Ser. No. 08/322,513 (now U.S. Pat. No. 5,548,839) which are incorporated by reference herein.

BACKGROUND OF THE INVENTION

1. Field of the Invention

The present invention is directed to a radio system having multiple transmitters and multiple receivers and, more particularly, to an antenna interface unit for connecting receivers and transmitters to an antenna while providing low power loss, fault-tolerant connectivity.

2. Description of the Related Art

There are many applications where multiple radio frequency (RF) transceivers (each including a transmitter and a receiver) are required in a fixed or a mobile station. Such transceivers are used, for example, in commercial airplanes, military airplanes, space platforms, military manpacks, and communications hubs. Each transceiver typically performs a single communication, navigation, surveillance or telemetry (CNST) function. Moreover, critical functions (such as avionics, instrument landing systems or communication links) require redundant transceivers to ensure high availability. These redundant transceivers must possess fault-tolerant RF connectivity to corresponding antennas. That is, the transceivers must be connected to an antenna such that a single-point failure (or sometimes a multiple-point failure) in the RF chain between the antenna and the transceivers does not cause the loss of a communication, navigation, surveillance or telemetry function. Similarly, where multiple antennas are used, the transceivers must be connected to the antennas such that a single-point or sometimes multiple-point failure in the RF chain between the antennas and the transceivers does not cause the loss of a communication, navigation, surveillance or telemetry function.

Figure 1:
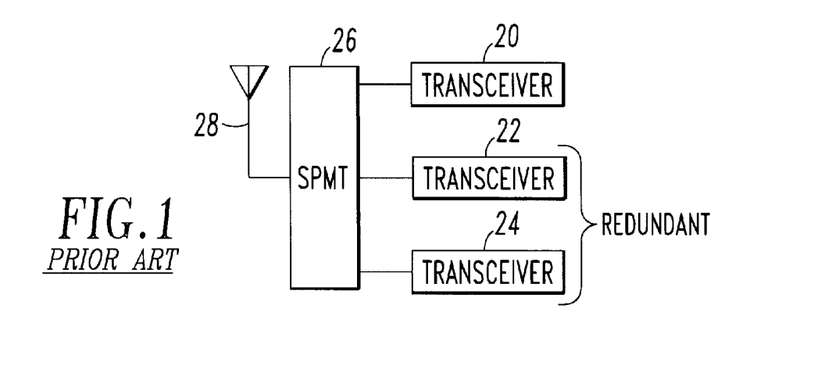
FIG. 1 (PRIOR ART) is a block diagram of a conventional transmit/receive system using a single-pole multiple throw switch (SPMT) to connect multiple receivers and multiple transmitters to a single antenna.

FIG. 1 illustrates a conventional system in which a main transceiver 20 and redundant transceivers 22 and 24 are connected to a single antenna 28 through a single pole multiple throw switch (SPMT) 26. A receive channel extends from antenna 28, through switch 26 and to a selected transceiver 20, 22 or 24. A transmit channel extends from a selected transceiver 20, 22 or 24, through switch 26 and to antenna 28. This system is not fault-tolerant because a single-point failure in switch 26 could deny antenna connectivity to all transceivers 20, 22 and 24, thereby breaking the transmit and receive channels.

Figure 2:
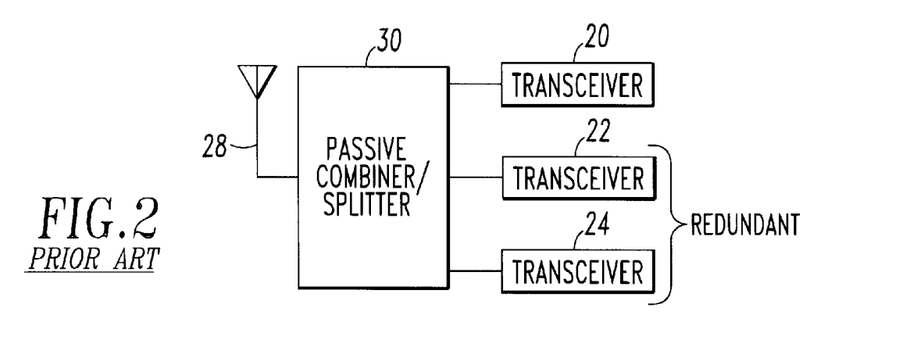
FIG. 2 (PRIOR ART) is a block diagram of a conventional transmit/receive system using a power combiner/splitter to connect multiple receivers and multiple transmitters to a single antenna.

FIG. 2 illustrates the use of a conventional RF power combiner/splitter 30, instead of switch 26. Combiner/splitter 30 is made of passive components and has essentially a zero failure rate. Thus, combiner/splitter 30 is an acceptable device for achieving the desired connectivity without the chance of a single-point failure. When it is desired to transmit information, combiner/splitter 30 operates as an RF power combiner by combining signals from transceivers 20, 22 and 24 into a combined signal which is provided to antenna 28. Therefore, the transmit channel extends from transceivers 20, 22 and 24, to RF power combiner/splitter 30 to antenna 28. Usually, however, only one of transceivers 20, 22 and 24 is turned ON to transmit at any time, and the other two transceivers act as redundant spares.

When it is desired to receive information, combiner/splitter 30 receives a signal from antenna 28 and operates as an RF power splitter by splitting the signal into three separate signals which are respectively provided to transceivers 20, 22 and 24. Therefore, the receive channel extends from antenna 28, to RF power combiner/splitter 30 to transceivers 20, 22 and 24. Both the transmit channel and the receive channel follow the same path and are essentially the same channel. That is, the same channel, extending from transceivers 20, 22 and 24 to antenna 28, operates as both the transmit channel and the receive channel. In both the transmit and receive channels, each transceiver 20, 22 and 24 is connected to antenna 28 via combiner/splitter 30. This can be compared to FIG. 1, where only one transceiver 20, 22 or 24 is connected to antenna 28 at a particular time.

Unfortunately, an RF power combiner/splitter (such as combiner/splitter 30) adds unacceptable loss in both the receive and transmit channels. For example, there is approximately a 5 Db loss for a conventional three-way combiner/splitter. Although some communication, navigation, surveillance or telemetry functions can afford such an additional front-end loss in the receive channel, the use of a three-way combiner requires that each transceiver 20, 22 and 24 is designed to supply RF transmit power that is three times higher than the amount needed if only one transceiver is connected directly to antenna 28. As a general example, if it is desired to produce a 40 watt signal at antenna 28 in the transmit channel, each transceiver 20, 22 and 24 in FIG. 1 should provide a 40 watt signal to switch 26. However, with the system in FIG. 2, each transceiver 20, 22 and 24 should provide approximately a 120 watt signal to combiner/splitter 30 to produce a 40 watt signal at antenna 28 due to the power loss in combiner/splitter 30. Thus, power combining imposes a severe power dissipation penalty for communication, navigation, surveillance or telemetry functions. This power dissipation penalty is especially high at high power levels. Similarly, in the receive channel, the signals received by each transceiver 20, 22 and 24 each have approximately 1/3 the power of the signal received by antenna 28. An amplifier (not illustrated) can be positioned between combiner/splitter 30 and antenna 28 to amplify transmitted and received signals. Unfortunately, the amplifier would be the source of a single-point failure that could bring the entire system down.

Figure 3:
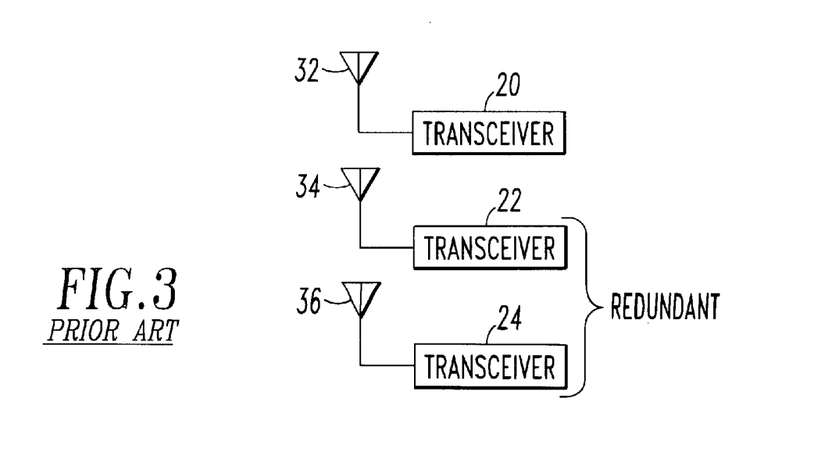
FIG. 3 (PRIOR ART) is a block diagram of a conventional transmit/receive system using separate, dedicated antennas respectively connected to separate transceivers.

FIG. 3 illustrates a system having redundant transceivers without having a potential single-point failure and without paying a power penalty. This type of system is particularly used in commercial air transports. As illustrated in FIG. 3, each transceiver 20, 22 and 24 is respectively coupled to a corresponding antenna 32, 34, 36, without the use of a switch or an RF power combiner/splitter. Although this use of separate antennas 32, 34 and 36 avoids high loss in the receive and transmit channels, and also avoids single-point failures associated with single-pole multiple throw switches, the use of separate antennas creates large, undesirable antenna farms.

Moreover, a programmable radio is capable of operating at many different radio functions (for example, VHF radio is one radio function). Therefore, it may be desirable to use programmable radios for each of transceivers 20, 22 and 24. However, if antennas 32, 34 and 36 are radio specific (that is, an antenna services only one or several specific radio functions), very little will be gained by using transceivers 20, 22 and 24 programmable to operate for many different radio functions, since the corresponding antennas would not be properly operable at the different radio functions.

Figure 4:
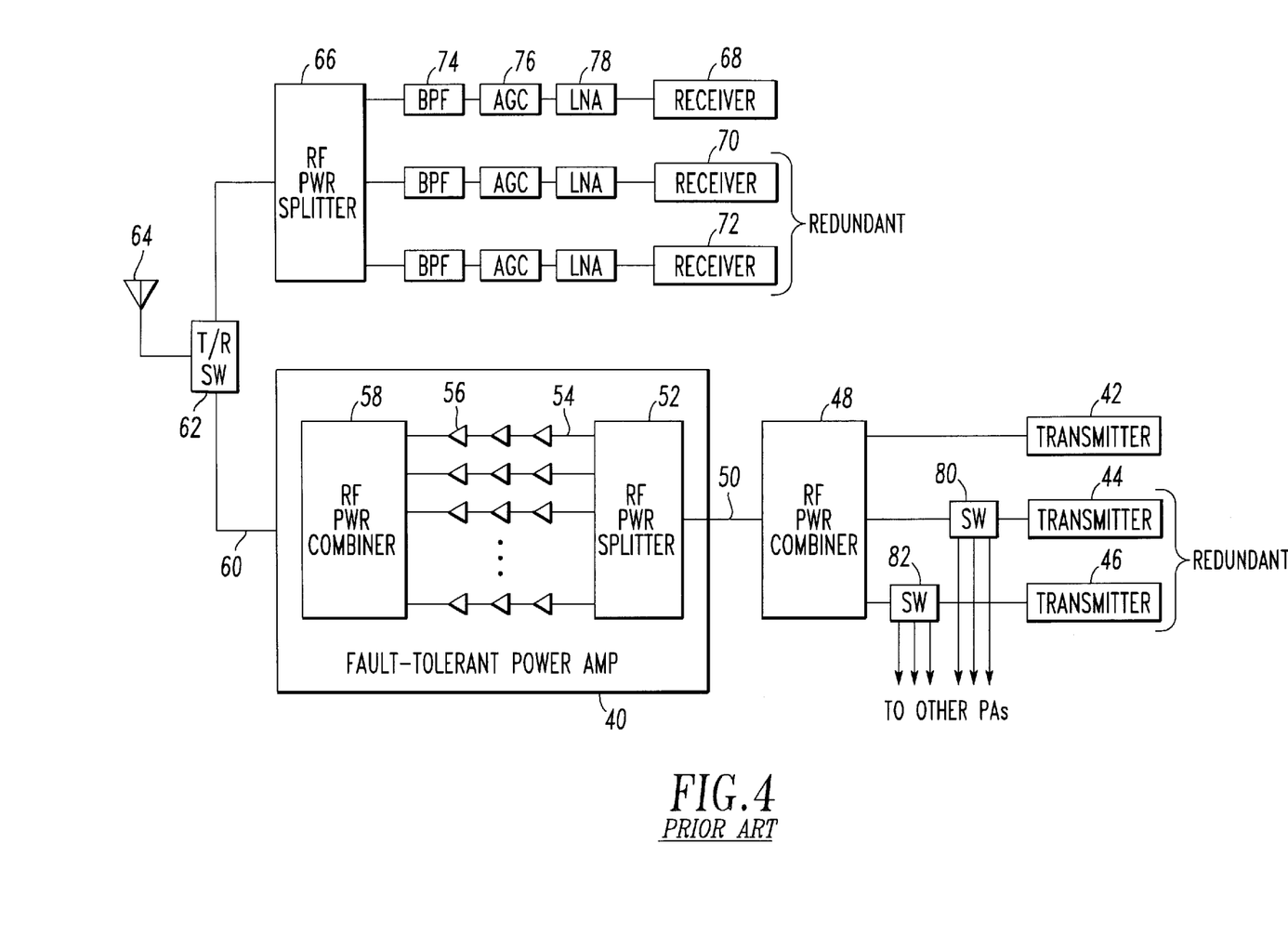
FIG. 4 (PRIOR ART) is a block diagram of a conventional transmit/receive system using a fault-tolerant power amplifier in the transmit channel and using a transmit/receive switch to connect the transmit channel and the receive channel to a single antenna.

FIG. 4 illustrates a conventional system which uses a conventional fault-tolerant power amplifier 40. In FIG. 4, a main transmitter 42 and redundant transmitters 44 and 46 are connected to an RF power combiner 48. RF power combiner 48 receives signals from transmitters 42, 44 and 46 and combines the signals to produce a combined signal on line 50. The combined signal on line 50 is fed to an RF power splitter 52 which splits the combined signal into a plurality of split signals which are respectively provided on parallel channels 54. Each parallel channel 54 includes amplifiers 56 to amplify the corresponding split signal. Split signals travelling along parallel channels 54 are then received and combined by an RF power combiner 58. RF power combiner 58 outputs a combined signal on line 60 which is fed to a transmit/receive switch (T/R SW) 62. T/R switch 62 is connected to a single antenna 64. Thus, the transmit channel extends from transmitters 42, 42 and 46, to RF power combiner 48, RF power splitter 52, RF power combiner 58 and to antenna 64. Fault-tolerant power amplifier 40 employs parallel channels 54 for redundancy, and parallel channels 54 are amplitude and phase matched between RF power splitter 52 and RF power combiner 58. Therefore, as illustrated by FIG. 4, fault-tolerant power amplifier 40 includes RF power combiner 58, RF power splitter 52 and parallel channels 54.

On the receive channel, a signal is received by antenna 64 and passes through T/R switch 62 to an RF power splitter 66. RF power splitter 66 is connected to a main receiver 68 and redundant receivers 70 and 72 via bandpass filters (BPF) 74, automatic gain controllers (AGC) 76, and low noise amplifiers (LNA) 78. Thus, the receive channel extends from antenna 64, to RF power splitter 66 and to receivers 68, 70 and 72. Redundant transmitters 44 and 46 can be connected to switches 80 and 82, respectively, for use with other communication, navigation, surveillance and telemetry functions.

While BPFs 74, AGCs 76 and LNAs 78 are illustrated in FIG. 4, other receiver front-end elements, such as receiver protectors (not illustrated), can be included between RF power splitter 66 and receivers 68, 70 and 72.

With a system as illustrated in FIG. 4, the receive and transmit channels are partitioned into separate channels. For example, signals travelling along the receive channel travel along a different route than signals travelling along the transmit channel. This partitioning or separation of the transmit channel and the receive channel avoids part of the single-point failure problem by using fault-tolerant power amplifier 40, and can be contrasted to FIG. 2 in which the same channel serves as both the transmit channel and the receive channel. Each single-point failure in one parallel channel 54 of fault-tolerant power amplifier 40 results only in the loss of a relatively small amount of transmit power, and sufficient power margin can be provided to allow a moderate number of failures before the total output power drops below the system requirement.

Transmitters 42, 44 and 46 are connected to fault-tolerant power amplifier 40 in a fault-tolerant manner by using RF power combiner 48 at the input to fault-tolerant power amplifier 40. The low-power RF loss resulting from RF power combiner 48 can be compensated with additional low-power gain in parallel channels 54. As a result, transmit power in the transmit channel is not lost, as compared to a system as illustrated in FIG. 2.

However, in the receive channel, RF power splitter 66 causes a front-end RF loss and causes a direct increase in the receive noise figure. The receive noise figure increases because the amount of noise in a received signal has a minimum level, called a noise "floor". The level of noise can not be reduced below the noise floor. Therefore, in RF power splitter 66, the signal power is reduced by approximately one-third, thereby resulting in approximately in a one-third reduction in the signal level. However, due to the noise floor, the noise signal is not reduced by one-third. Thus, the signal to noise ratio (S/N) of the received signal is less at the output of RF power splitter 66 than it was at the input to RF power splitter 66. As a result, the receive channel from RF power splitter 66 to receiver 68, the receive channel from RF power splitter 66 to receiver 70 and the receive channel from RF power splitter 66 to receiver 72 each experience a receive noise figure penalty due to the loss in the RF power splitter 66.

Moreover, the system as disclosed in FIG. 4 does not have fault-tolerance for the complete system because T/R switch 62 is still the source of a single-point failure. Thus, the failure of T/R switch 62 will bring the entire system down. The use of a circulator in place of T/R switch 62 may eliminate the source of a single-point failure in transmit/ receive duplexing, but doing so assumes that a circulator will be acceptable as failure free and that practical applicators can be realized at the desire operating frequency. However, circulators are not practical for many important applications below 500 MHz.

SUMMARY OF THE INVENTION

It is therefore an object of the present invention to provide improved connectivity between an antenna and multiple transceivers. Typically, the totality of the components for connecting multiple transceivers (each transceiver including a receiver and a transmitter) to an antenna is referred to as an "antenna interface unit" (AIU). Therefore, the present invention provides a low-loss, fault-tolerant AIU. However, it is obvious to those of skill in the art that an antenna can refer to many types of RF units, such as an RF transmission line or test equipment, in which case the AIU can be referred to as, more generally, an interface unit.

Additionally, it is an object of the present invention to provide an AIU which eliminates sources of single point failures.

It is also an object of the present invention to provide an AIU having an improved receive noise figure penalty in the receiver channel, and a reduced power loss in the transmit channel.

Objects of the present invention are achieved by providing an antenna interface unit for connecting receivers and transmitters to an antenna. The antenna interface unit includes (a) a power combiner/splitter connectable to the antenna; (b) a receive channel connected to the power combiner/splitter; and (c) a transmit channel connected to the power combiner/splitter. The transmit channel is a different channel from the receive channel. The receivers are connectable to the antenna via the receive channel and through the power combiner/splitter. Also, the transmitters are connectable to the antenna via the transmit channel and through the power combiner/splitter.

Objects of the present invention are also achieved by providing an antenna interface unit including a power combiner/splitter connectable to the antenna. Receive channels respectively correspond to the receivers and are connected to the power combiner/splitter. The receivers are connectable to the antenna via the receive channels and through the power combiner/splitter. A transmit channel is connected to the power combiner/splitter and is a different channel from each of the receive channels. The transmitters are connectable to the antenna via the transmit channel and through the power combiner/splitter.

The transmit channel includes a power combiner which is connected to the transmitters, receives signals transmitted by the transmitters and produces a corresponding combined signal. However, usually only one of the transmitters is activated at a time, and the other transmitters serve as redundant spares. A power splitter is connected to the power combiner and to first stage parallel channels. The power splitter receives the combined signal produced by the power combiner, and produces split signals on the first stage parallel channels. The transmit channel also has second stage parallel channels equal in number to the number of receive channels. Summers are connected between the first stage parallel channels and the second stage parallel channels. The summers receive the split signals from the first stage parallel channels, and produce summed signals on the second stage parallel channels. Transmit/receive (T/R) switching mechanisms, respectively correspond to the receive channels and the second stage parallel channels. Each T/R mechanism receives the corresponding receive channel and the corresponding second stage second stage parallel channel and selectively allows either the corresponding receive channel to receive signals from the antenna via the power combiner/splitter or the corresponding second stage parallel channel to transmit signals to the antenna via the power combiner/splitter.

Objects of the present invention are further achieved by providing different variations of the receive channel and the transmit channel, by using different combinations of power combiners and power splitters.

BRIEF DESCRIPTION OF THE DRAWINGS

These and other objects and advantages of the present invention will become apparent and more readily appreciated from the following description of the preferred embodiments, taken in conjunction with the accompanying drawings of which.

DESCRIPTION OF THE PREFERRED EMBODIMENTS

Figure 5:
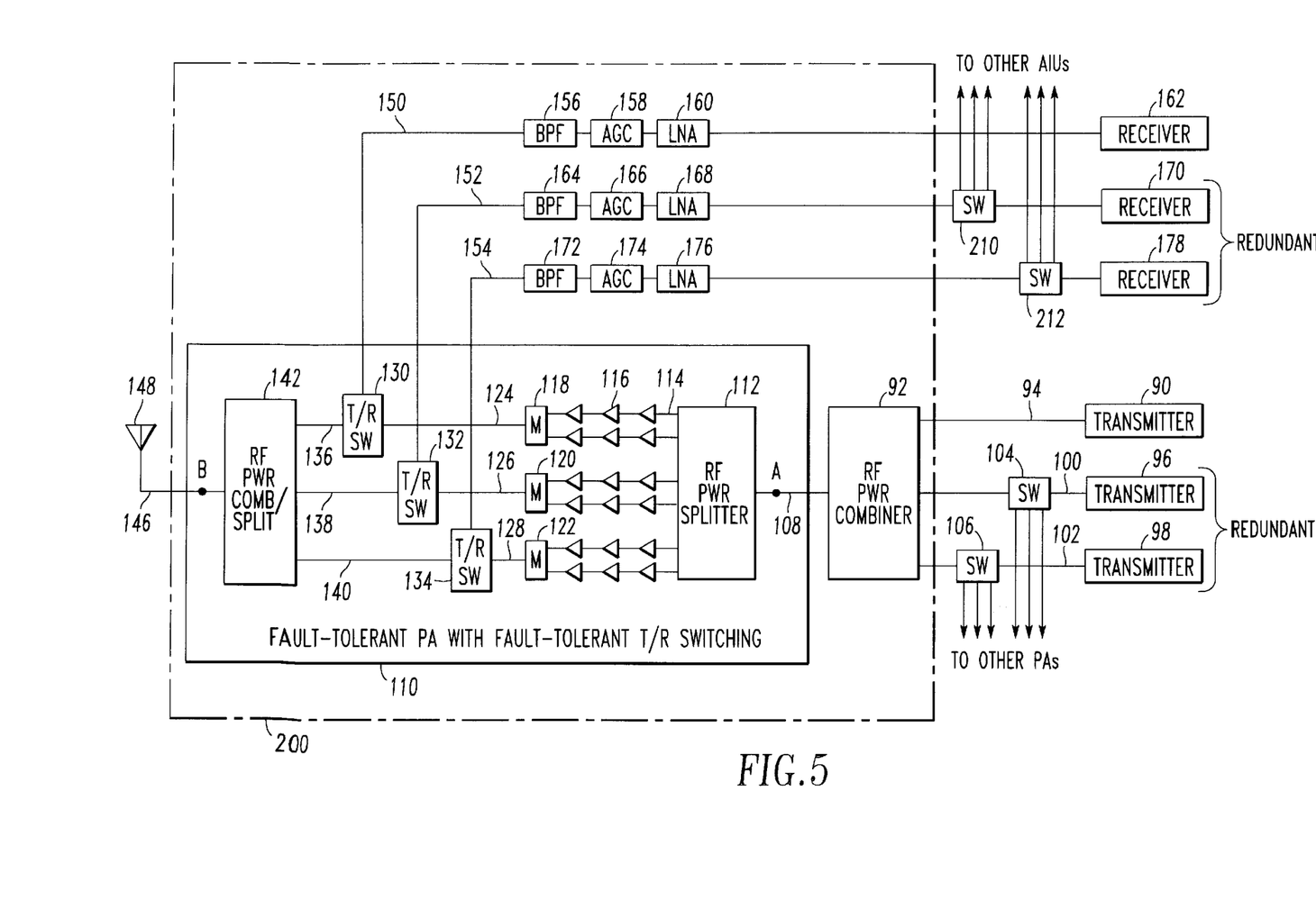
FIG. 5 is a block diagram of a transmit/receive system having fault-tolerant RF connectivity between an antenna and multiple transmitters, and between the antenna and multiple receivers, according to a first embodiment of the present invention.

Reference will be made to the figures wherein like reference numerals represent similar structures or processes throughout the drawings. More particularly, FIG. 5 is a transmit/receive system having fault-tolerant RF connectivity between an antenna and multiple transmitters, and between the antenna and multiple receivers, according to a first embodiment of the present invention. To understand the fault-tolerant aspect of the system in FIG. 5, it must be understood that certain components have essentially a zero failure rate. For example, RF power combiners/splitters comprise passive components and can be assumed to have zero failure rates. Similarly, cables and connectors can be assumed to have essentially a zero failure rate, such that the probability of a single point failure is insignificant compared to the overall failure rate of the system. In FIG. 5, a main transmitter 90 is connected to a conventional RF power combiner 92 via line 94. Redundant transmitters 96 and 98 are connected to RF power combiner 92 via lines 100 and 102, respectively. Conventional switches 104 and 106 allow transmitters 96 and 98 to respectively be connected to other systems. For example, switch 106 can switch transmitter 98 to a power amplifier (not illustrated) in a different transmitting system (not illustrated) when transmitter 90 is functioning properly. Moreover, switches 104 and 106 can be eliminated and transmitters 96 and 98 can be connected directly to RF power combiner 92.

RF power combiner 92 receives the outputs from transmitters 90, 96 and 98 and, in a conventional manner, combines these outputs to form a combined output on line 108. Normally, only one of the transmitter outputs are active at one time. The combined output on line 108 is fed to a fault-tolerant power amplifier 110. Specifically, the combined output on line 108 is fed to a conventional RF power splitter 112 of power amplifier 110. RF power splitter 112, in a conventional manner, splits the signal present at point A into multiple signals on parallel channels 114. Each parallel channel 114 includes conventional amplifiers 116. Conventional summers 118, 120, and 122 each receive signals from two parallel channels 114 and produce output signals on respectively corresponding lines 124, 126 and 128. Signals on lines 124, 126 and 128 represent summed signals from the corresponding parallel channels 114 and are respectively received by 132, and 134. Transmit/receive switches 130, 132 and 134 produce output signals on lines 136, 138 and 140, respectively. Signals on lines 136, 138 and 140 are received by a conventional RF power combiner/splitter 142 which combines the signals and produces a combined signal on line 146. The combined signal is provided to an antenna 148 via line 146. Therefore, a transmit channel extends from transmitters 90, 96 and 98, through RF power combiner 92, RF power splitter 112, RF power combiner/splitter 142, to antenna 148. As illustrated in FIG. 5, power amplifier 110 includes RF power combiner/splitter, transmit/receive switches 130, 132, 134, summers 118, amplifiers 116, parallel channels 114 and RF power splitter 112. A specific number of parallel channels 114 are illustrated. However, the number of parallel channels can be increased or reduced. Also, for example, summers can be eliminated, and the parallel rows of amplifiers 116 can be removed. Also, as explained later, parallel channels 114 are amplitude and phase matched between points A and B.

On receive, a signal is received by antenna 128 and fed to RF power combiner/splitter 142 via line 146. The received signal is split by RF power combiner/splitter 142 into separate signals on lines 136, 138 and 140. Transmit/receive (T/R) switches 130, 132 and 134 (or other suitable T/R mechanism, such as circulators or frequency diplexers) allow signals on lines 136, 138 and 140 to be transferred to lines 150, 152 and 154. Signals on line 150 pass through a conventional bandpass filter (BPF) 156, a conventional automatic gain controller (AGC) 158, and a conventional low noise amplifier (LNA) 160 to a main receiver 162. Signals on line 152 pass through a conventional bandpass filter (BPF) 164, a conventional automatic gain controller (AGC) 166, and a conventional low noise amplifier (LNA) 168 to a redundant receiver 170. Similarly, signals on line 154 pass through a conventional bandpass filter (BPF) 172, a conventional automatic gain controller (AGC) 174, and a conventional low noise amplifier (LNA) 176 to a redundant receiver 178. Therefore, lines 150, 152 and 154 respectively correspond to individual, parallel receive channels extending from RF power combiner/splitter 142 to receivers 162, 170 and 178. While various BPFs, AGCs and LNAs are illustrated, other receiver front-end elements, such as receiver protectors (not illustrated), can be included between T/R switches 130, 132 and 134 and the respective receivers 162, 170 and 178.

As illustrated in FIG. 5, transmit/receive switches 130, 132, and 134 are redundant switches which are added in the transmit path of power amplifier 110. Instead of transmit/receive switches 130, 132 and 134, transmit/receive duplexers (such as conventional circulators or diplexers) can be used.

When in receive mode, only one usually transmit/receive switch 130, 132 or 134 is active, thereby creating a dedicated receive channel from antenna 148, through RF power combiner/splitter 142, through the active transmit/receive switch 130, 132 and 134 and to the corresponding receiver 162, 170 or 178. Thus, in the receive channel, only one receiver 162, 170 or 178 is connected to antenna 148 at a particular time. However, when in transmit mode, all three transmit/receive switches 130, 132 and 134 are active at the same time. Thus, in the transmit channel, all three transmitters 90, 96 and 98 can be coupled to antenna 148 at a particular time and all of the parallel channels 114 are fed, via summers 118, to RF power combiner/splitter 142. Therefore, power amplifier 110 operates as a fault tolerant power amplifier with fault-tolerant transmit/receive switching, and with relatively little loss in transmit power due to amplifiers 116.

FIG. 5 only illustrates three transmit/receive switches. However, additional transmit/receive switches can be added by incorporating the appropriate combination of transmit/receive switches, RF power summers and parallel amplifier channels. The actual number of transmit/receive switches (or other type of duplexer) and parallel amplifier channels is determined by reliability, availability considerations, as well as the tolerable incremental loss in transmit power when one of the parallel channels (including a transmit/receive switch) is lost. However, adding transmit/receive switches reduces the power rating requirement of each individual switch.

RF power combiner/splitter 142, transmit/receive switches 130, 132 and 134, summers 118, 120 and 122, amplifiers 116, RF power splitter 112, RF power combiner 92, BPFs 156, 164 and 172, AGCs 158, 166 and 174 and LNAs 160, 168 and 176 together form an antenna interface unit (AIU) 200. AIU 200 can then be built and packaged as a signal unit. However, based on a particular application, additional components can be included in, or left out of, the single unit. For example, RF power combiner 92 can be packaged in the single unit, or can be externally connected to the single unit. Such packaging of components inside or outside of a single unit or "module" is described in related disclosure entitled DIGITALLY PROGRAMMABLE MULTIFUNCTION RADIO SYSTEM ARCHITECTURE, previously mentioned.

Conventional switches 210 and 212 are respectively connected to redundant receivers 170 and 178 and allow redundant receivers 170 and 178 to be selectively switched to other AIUs when the main receiver 162 is operating properly. Similarly, switches 104 and 106 are respectively connected to redundant transmitters 96 and 98 and allow redundant transmitters 96 and 98 to be selectively switched to other power amplifiers or AIUs when the main transmitter 90 is operating properly.

In the transmit path, the system should be amplitude and phase matched between points A and point B in FIG. 5. This amplitude and phase matching produces a well-known, maximum combining effect between RF power splitter 112 and RF power combiner/splitter 142. Thus, when transmitting, the power of the combined signal on line 146 will be maximized and the power loss in the transmit channel resulting from the use of RF power splitter 112 and RF power combiner/splitter 142 is minimized.

RF power combiner 92, RF power splitter 112 and RF power combiner/splitter 142 each have essentially a zero failure rate. Thus, the transmission paths from each transmitter 90, 96 and 98 to antenna 148 provide fault-tolerant connectivity in the transmit channel without the possibility of incurring a single-point failure. By contrast, the conventional system in FIG. 4 can experience a single-point failure in transmit/receive switch 62. In addition, in the system illustrated in FIG. 5, the amplitude and phase are matched between points A and B to minimize the power loss in the transmit channels. Thus, the system in FIG. 5 results in a fault-tolerant, low loss transmit channel from transmitters 90, 96 arid 98 to antenna 148. Similarly, the receive channels illustrated in FIG. 5 eliminate the chance of a single-point receive failure. By contrast, the receive channel of the conventional system in FIG. 4 can experience a single-point failure in transmit/receive switch 62.

As described for the receive channel in FIG. 4, RF power combiner/splitter 142 in FIG. 5 causes a front-end RF power loss and causes a direct increase in the receive noise figure. The receive noise figure increases because the signal strength is reduced by RF power combiner/splitter 142, but the noise is not reduced by the same factor since the noise floor prevents the noise from being reduced below the noise floor. Thus, the signal-to-noise (S/N) ratio of signals received by receivers 162, 170 and 178 will have a reduced S/N ratio as compared to the received signal on line 146. However, this reduced S/N ratio may be acceptable in some applications.

In summary, FIG. 5 illustrates antenna interface unit 200 for connecting receivers 162, 170, 178 and transmitters 90, 96, 98 to antenna 148. Antenna interface unit 200 includes RF power combiner/splitter 142 connected to antenna 148. Receive channels 150, 152, 154 respectively correspond to receivers 162, 170, 178 and are connected to RF power combiner/splitter 142. Receivers 162, 170, 178 are connectable to antenna 148 via receive channels 150, 152, 154 and through RF power combiner/splitter 142. A transmit channel is connected to RF power combiner/splitter 142, the transmit channel being a different channel from each of the receive channels. Transmitters 90, 96 and 98 are connectable to antenna 148 via the transmit channel and through RF power combiner/splitter 142. The transmit channel includes RF power combiner 92 which is connected to transmitters 90, 96, 98, receives signals transmitted by transmitters 90, 96 98 and produces a corresponding combined signal; first stage parallel channels 114; RF power splitter 112 which is connected to RF power combiner 92 and first stage parallel channels 114, receives the combined signal produced by RF power combiner 92, and produces split signals on first stage parallel channels 114; second stage parallel channels (represented by lines 136, 138, 140) equal in number to the number of receive channels; summers 118, 120, 122 which are connected between first stage parallel channels 114 and the second stage parallel channels, receive the split signals from first stage parallel channels 114, and produce summed signals on the second stage parallel channels; and switching mechanisms 130, 132, 134 respectively corresponding to receive channels 150, 152, 154 and the second stage parallel channels. Each switching mechanism receives the corresponding receive channel and the corresponding second stage parallel channel and selectively allows either the corresponding receive channel to receive signals from antenna 148 via RF power combiner/splitter 142 or the corresponding second stage parallel channel to transmit signals to antenna 148 via RF power combiner/splitter 142. Also, summers 118 and three rows of amplifiers 116 can be eliminated so that there is only one stage of parallel transmit channels.

Figure 6:
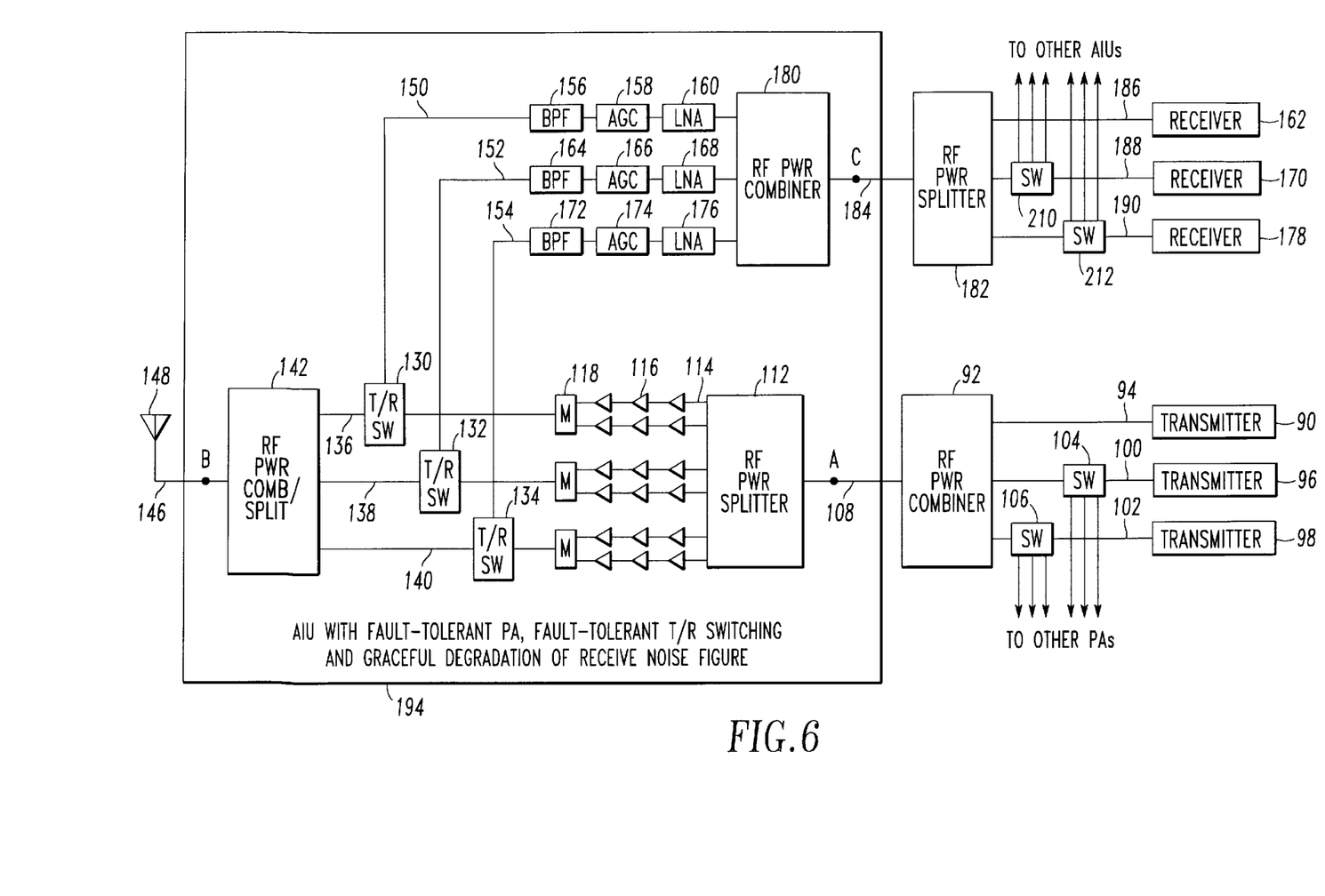
FIG. 6 is a block diagram of a transmit/receive system having fault-tolerant RF connectivity between an antenna and multiple transmitters, and between the antenna and multiple receivers, according to a second embodiment of the present invention.

FIG. 6 is a transmit/receive system having fault-tolerant RF connectivity between an antenna and multiple transmitters, and between the antenna and multiple receivers, according to a second embodiment of the present invention. FIG. 6 is similar to FIG. 5, except that the system in FIG. 6 uses a conventional RF power combiner 180 and a conventional RF power splitter 182 to provide a system having an improved receive noise figure penalty over the system illustrated in FIG. 5. Thus, the transmit channel in FIG. 6 is the same as the transmit channel in FIG. 5 (that is, it has the same fault tolerance). However, the receive channel in FIG. 6 is different from the receive channel in FIG. 5.

In FIG. 6, on receive, a signal is received by antenna 148 and provided to RF power combiner/splitter 142 via line 146. RF power combiner/splitter 142 splits the signal onto lines 136, 138 and 140. The signals on lines 136, 138 and 140 are switched by transmit/receive switches 130, 132 and 134 to lines 150, 152 and 154, respectively. The signal on line 150 passes through bandpass filter (BPF) 156, automatic gain controller (AGC) 158 and low noise amplifier (LNA) 160 to conventional RF power combiner 180. The signal on line 152 passes through bandpass filter (BPF) 164, automatic gain controller (AGC) 166 and low noise amplifier (LNA) 168 to RF power combiner 180. Similarly, the signal on line 154 passes through bandpass filter (BPF) 172, automatic gain controller (AGC) 174 and low noise amplifier (LNA) 176 to RF power combiner 180. While BPFs, AGCs and LNAs are illustrated, other receiver front-end elements, such as receiver protectors (not illustrated), can be included between the switching mechanism 130, 132 and 134, and RF power combiner 180.

Thus, lines 150, 152 and 154 represent individual, parallel receive channels which together form a combined fault-tolerant receive channel. RF power combiner 180 combines the received signals and produces a combined output signal on line 184. The combined signal on line 184 is received by a conventional RF power splitter 182 which splits the combined signal into individual signals on lines 186, 188 and 190. The signals on lines 186, 188 and 190 are received by receivers 162, 170 and 178, respectively. RF power combiner/splitter 142, RF power splitter 112, RF power combiner 180, transmit/receive switches 130, 132 and 134, parallel channels 114, amplifiers 116, summers 118, BPFs 156, 164 and 172, AGCs 158, 166 and 174, and LNAs 160, 168 and 176 can be combined into a single antenna interface unit (AIU) 194. AIU 194 could then be manufactured and packaged as a single unit. Depending on the particular system requirements, RF power splitter 182 and RF power combiner 92 could also be included in AIU 194.

In contrast to the system in FIG. 5 where each individual receive channel 150, 152, 154 (that is, the individual receive channels from RF power combiner/splitter 142 to receiver 162, from RF power combiner/splitter 142 to receiver 170, and from RF power combiner/splitter 142 to receiver 178) experiences a receive noise figure penalty due to the front-end RF loss in RF power combiner/splitter 142, the system in FIG. 6 provides fault-tolerant redundant receive channels with only a small penalty in the receive noise figure resulting from the insertion loss of RF power combiner/splitter 142. Here, the redundant receive channels are amplitude and phase matched between points B and C in FIG. 6, and all redundant front-end receive channels (including transmit/receive switches 130, 132 and 134, BPFs 156, 164 and 170, AGCs 158, 166 and 174, and LNAs 160, 168 and 176) are active at the same time. Thus, the power loss in the receive channel in minimized. The amplitude and phase matching is particularly easy for many application below 2 GHz. Because LNAs 160, 168 and 176 can easily be operated to overcome the receive noise figure penalty for the elements following point C (in particular, RF power splitter 180), the receive noise figure penalty is reduced to a value equal to the insertion loss in RF power combiner/splitter 142 near point B. Thus, the receive noise figure will "degrade gracefully" as each parallel receive channel fails. In summary, antenna interface unit 194 functions as a fault-tolerant power amplifier with fault-tolerant transmit/receive switching and graceful degradation of the receive noise figure.

Conventional switches 210 and 212 are respectively connected to redundant receivers 170 and 178 and allow redundant receivers 170 and 178 to be selectively switched to other AIUs when the main receiver 162 is operating properly. Similarly, switches 82 and 80 are respectively connected to redundant transmitters 96 and 98 and allow redundant transmitters 96 and 98 to be selectively switched to other power amplifiers or AIUs when the main transmitter 90 is operating properly.

As described above, the system in FIG. 6 has an improved receive noise penalty as compared to the system in FIG. 5. Thus, the system in FIG. 6 also has improved signal-to-noise (S/N) performance as compared to the system in FIG. 5. The following is an example of the signal-to-noise (S/N) ratio at various points in FIG. 5, as compared to various points in FIG. 6. The following S/N ratios are only very general examples and are not intended to be precise engineering computations. At point B in FIG. 5, it can be assumed, for example, that a signal received by antenna 148 has a S/N ratio approximately equal to 1/1. RF power combiner/ splitter 142 splits the signal into three split signals on lines 136, 138 and 148. Thus, in theory, the split signals on lines 136, 138 and 140 each have approximately 1/3 the signal level and the same noise floor level of the signal on line 146. (As previously described, the noise level has a "noise floor" and the noise level cannot be reduced below the noise floor.) Therefore, the split signals on lines 136, 138 and 140, reflecting the insertion loss of RF power splitter 142, have approximately 1/3 of the signal level of the signal on line 146, but, due to the noise floor, the noise on each line 136, 138 and 140 remains at a level which is the noise level of the signal on line 146. As a result, the signals received by receivers 162, 170 and 178 have a lower and less desirable S/N ratio of about 1/3. Specifically, the signals received by receivers 162, 170 had 178 each have a S/N ratio which is approximately 1/3 of the value if there was not splitting of power in RF power splitter 142.

In FIG. 6, it can be assumed that the signal on line 146 also has a S/N ratio equal to 1/1, thereby indicating that the signal level equals 1 and the noise level equals 1. The signal on line 146 is then split by RF power splitter 142, thereby resulting in split signals on lines 136, 138 and 140 which each have a S/N ratio which is lower than 1/3. Similarly, the S/N ratio along each line 150, 152 and 154, after each of LNAs 160, 168 and 176, is lower by 1/3 due to RF power splitter 142. The signals are then combined by RF power combiner 180. Moreover, the signal is amplitude and phase matched between points B and C in FIG. 6. As a result, the signal level from each signal fed into RF power combiner 180 is generally added together to form a combined signal on line 184. However, the noise is random and is not amplitude and phase matched. Also, the noise levels at the outputs of LNAs 160, 168 and 170 are significantly above the noise floor. The net result is that the S/N ratio at the output of RF power combiner 180 is, except for the insertion loss of RF power splitter 142, approximately the same as the output of a single receive channel (comprised of a T/R switch or mechanism, BPF, AGC and LNA) connected directly to point B. Moreover, because the noise level at the output of each LNA 160, 168 and 176, as well as at point C, is significantly above the noise floor due to the gain in the LNAs, the S/N ratio at receivers 162, 170 and 170 is not degraded by RF power splitter 142.

Figure 7:
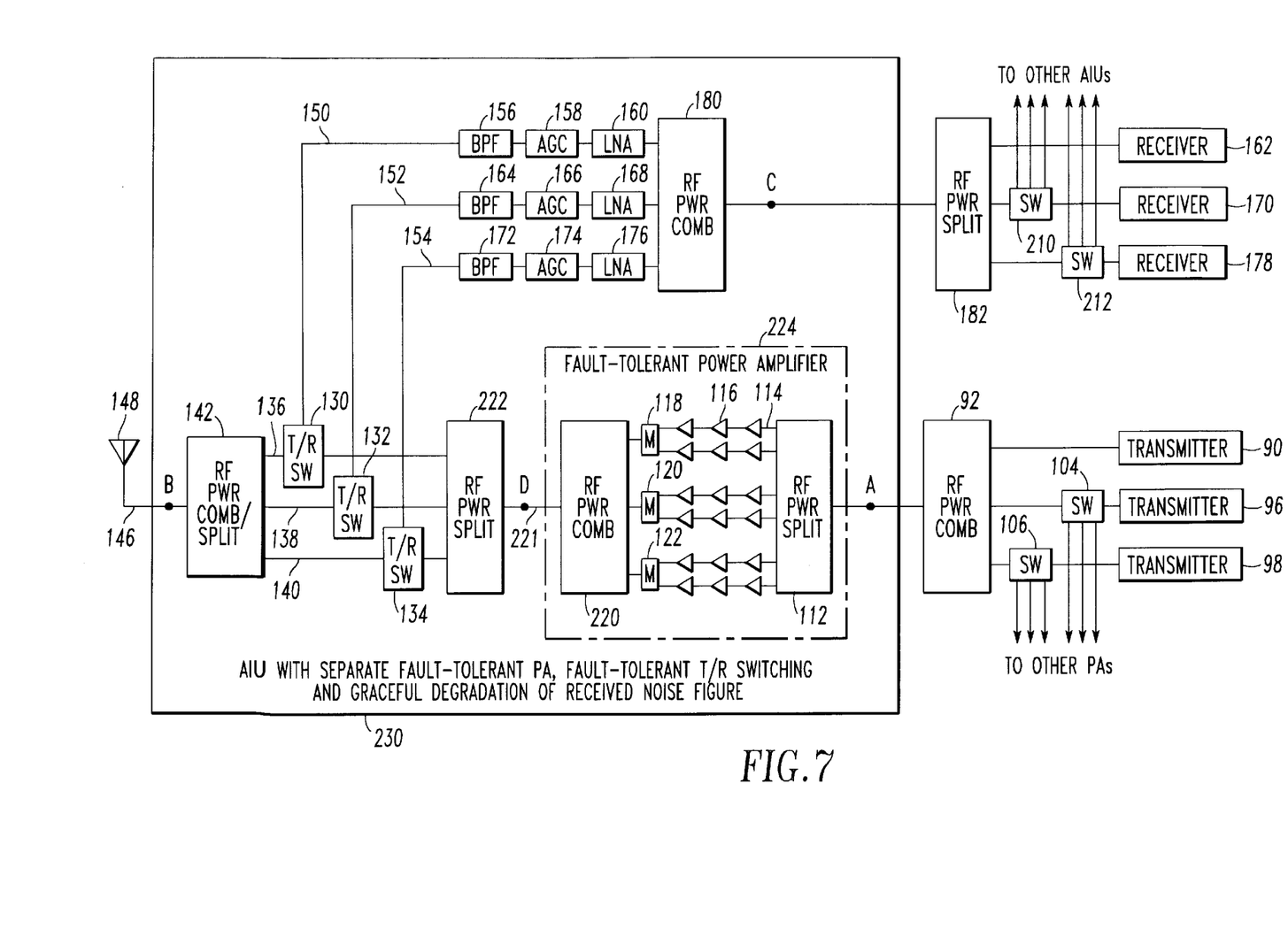
FIG. 7 is a block diagram of a transmit/receive system having fault-tolerant RF connectivity between an antenna and multiple transmitters, and between the antenna and multiple receivers, according to a third embodiment of the present invention.

FIG. 7 is a block diagram of a transmit/receive system having fault-tolerant RF connectivity between an antenna and multiple transmitters, and between the antenna and multiple receivers, according to a third embodiment of the present invention. The system in FIG. 7 is similar to the system in FIG. 6, except that the system in FIG. 7 uses a conventional RF power combiner 220 and a conventional RF power splitter 222 to permit a fault-tolerant power amplifier to be separately manufactured and to function as a standalone module.

As illustrated in FIG. 7, summed signals from parallel channels 114 are received by RF power combiner 220, which produces a combined signal on line 221. The combined signal is then fed to RF power splitter 222 which splits the combined signal onto lines 136, 138 and 140. With this configuration, RF power combiner 220, summers 118, 120 and 122, amplifiers 116, parallel channels 114 and RF power splitter 112 together from a fault-tolerant power amplifier 224 which can be packaged as a standalone unit or "module".

RF power combiner/splitter 142, transmit/receive switches 130, 132 and 134, RF power splitter 222, RF power combiner 220, summers 118, 120 and 122, amplifiers 116, RF power splitter 112, BPFs 156, 164 and 172, AGCs 158, 166 and 174, LNAs 160, 168 and 176, and RF power combiner 180 together form an antenna interface unit (AIU) 230. RF power combiner 92 and RF power splitter 182 could also be included as part of a single module forming AIU 230. Conventional switches 210 and 212 are respectively connected to redundant receivers 170 and 178 and allow redundant receivers 170 and 178 to be selectively switched to other AIUs when the main receiver 162 is operating properly. Similarly, switches 104 and 106 are respectively connected to redundant transmitters 96 and 98 and allow redundant transmitters 96 and 98 to be selectively switched to other power amplifiers or AIUs when the main transmitter 90 is operating properly. Therefore, AIU 230 includes a separate fault-tolerant power amplifier 224. In addition, AIU 230 has fault-tolerant transmit/receive switching and graceful degradation of receive noise figure.

On transmit, phase and amplitude should be matched between points A and D in FIG. 7. Also, on transmit, phase and amplitude should be matched between points B and D to allow for fault-tolerant transmit/receive switching similar to that previously explained. On receive, phase and amplitude should also be matched between points B and C in FIG. 7 to allow for the graceful degradation of the receive noise figure.

While the embodiment of the present invention illustrated in FIG. 7 allows power amplifier 224 to be built separately from the transmit/receive switching and the receive channels, there is an additional loss in transmit power associated with the inherent losses of RF power combiner 142 and RF power splitter 222.

The above embodiments of the present invention illustrate low power loss, fault-tolerant connectivity between multiple receivers and an antenna and multiple transmitters and an antenna. Such connectivity avoids the potential for a signal point failure which can bring the entire system down. Also, low power loss is extremely important in the transmission channel so that large power amplifiers and not required and so that power is not wasted. The above embodiments of the present invention also reduce the receive noise penalty.

According to the above embodiments of the present invention, redundant transmit channels are connected to an antenna (or other single point) in a fault-tolerant manner without incurring high losses in the transmitter path. In addition, the present invention avoids a penalty in front-end receiver loss when input power is split between several receive channels. Also, the power rating of a transmit/ receive duplexer is reduced by adding parallel transmit/ receive channels.

Figure 8:
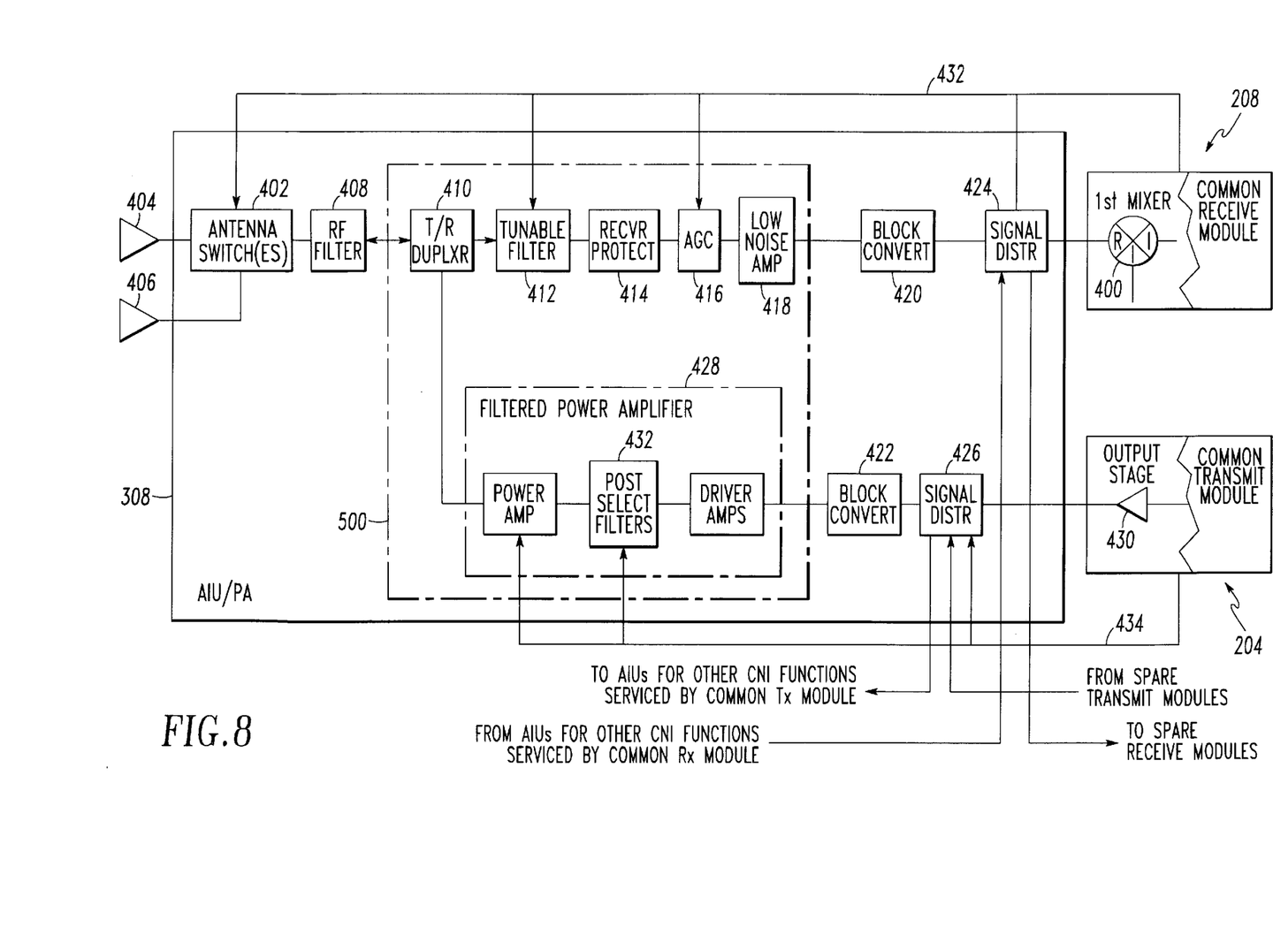
FIG. 8 is a block diagram of an antenna interface unit (AIU) of a programmable digital radio, according to an embodiment of the present invention.

FIG. 8 is a block diagram of an antenna interface unit (AIU) of a programmable digital radio according to an embodiment of the present invention and further discussed in related disclosure entitled DIGITALLY PROGRAMMABLE MULTIFUNCTION RADIO SYSTEM ARCHITECTURE, previously mentioned. A major feature of the invention of related disclosure entitled DIGITALLY PROGRAMMABLE MULTIFUNCTION RADIO SYSTEM ARCHITECTURE, previously mentioned, is the partitioning of the RF hardware into non-common antenna interface units (AIU) 308, common receive modules 208 and common transmit modules 204. Each receiver 162, 170, 178 of the present invention corresponds to a respective common receive module 208, and each transmitter 90, 96, 98 of the present invention corresponds to a respective common transmit module 204. Common receive module 208 is illustrated as receiving a signal from a first mixer 400.

AIUs can be tailored for specific applications. Conventional antenna switches 402 are provided to switch between antennas 404 and 406 which perform different transmit/receive functions. A conventional RF filter 408 can be provided to perform any necessary isolation of different radio band signals received by the antennas. If the same antenna is used for receive as well as transmit functions, a transmit/receive duplexer 410 can be provided. A conventional tunable filter 412 can be programmable by common receive module 208 or common transmit module 204, and can be provided to further eliminate unwanted signal noise or crosstalk and to pick out the signal of interest from among multiple signals or strong interference. When common receive module 208 is located in potentially damaging electromagnetic (EM) locations, a protection circuit 414 can be provided to prevent strong RF signals from damaging common receive module 208. In some circumstances, a conventional automatic gain control (AGC) circuit 416 is included in AIU 308. A conventional low noise amplifier 418 produces a power boost to improve dynamic range before the receive signal is downconverted. In rare or unusual situations where a received signal is outside the frequency design range of common receive module 208, a conventional block down convert unit 420, which includes a reference oscillator and a mixer, can be provided to move the received signal into the frequency range of common receive module 208. A block conversion unit 422 can also be included in the transmit signal path. The block frequency conversion extends the frequency range above and below the typical frequency range (2 MHz to 2 GHz) of common receive module 208 or common transmit module 204. When the channel requires redundancy or other requirements where the signal from common receive module 208 or to common transmit module 204 needs to be routed, conventional signal distribution units 424 and 426 can be provided. Signal distribution units 424 and 426 can be conventional switches or conventional RF power splitters and combiners. The transmit and receive signal distribution units 424 and 426 typically are for: (1) sharing a common receive module 208 or a common transmit module 204 among various AIUs 308 that are particular to different communication, navigation and interrogation (CNI) functions, and (2) allocating spare receive modules 208 or transmit modules 204 that can be reprogrammed to support different CNI AIUs in the event of failure of the primary receive module or transmit module. A filtered power amplifier 428 provides power amplification in the transmit channel.

The actual elements used in an AIU 308 and their ordering in the string depends upon the particular application. Some communication, navigation and interrogation (CNI) functions require only an input bandpass or lowpass filter in the AIU. Other CNI functions and applications may require receiver protection, AGC, and/or preamplification.

For signal transmission, the output of common transmit module 204 feeds into AIU 308. Highly linear amplifiers 430 may be included in the output path of common transmit module 204, and the same output level is maintained for all CNI functions. The use and placement of a postselector filter 432 among the various amplifier stages is tailored to application dependent emissions requirements. AIU 308 receives control data (e.g., switch, filter and gain settings) via an AIU receive control bus 432 directly from common receive module 208 in the AIU's corresponding channel. Transmit data, such as push-to-talk, instantaneous modulation levels are sent over an AIU transmit control bus 434 from the common transmit module 204 in the AIU's corresponding channel. AIU built-in test can be initiated via either the AIU receive control bus 432 or the transmit control bus 434.

Thus, AIU 308 is designed for a programmable digital radio as discussed in related disclosure entitled DIGITALLY PROGRAMMABLE MULTIFUNCTION RADIO SYSTEM ARCHITECTURE, previously mentioned. In FIG. 8, "dotted enclosure" 500 is illustrated as enclosing transmit/receive duplexer 410, tunable filter 412, protection circuit 414, AGC 416, low noise amplifier 418 and filtered power amplifier 428. However, AIU 308 can easily be modified to include AIU 200 of FIG. 5, AIU 194 of FIG. 6 or AIU 230 of FIG. 7, by replacing the dotted enclosure 500 with either AIU 200, AIU 194 or AIU 230, respectively. In FIG. 8, signal distribution unit 424 represents switches 210 and 212, and signal distribution unit 426 represents switches 104 and 106. Therefore, a person skilled in the art can easily modify AIU 308 to include the various embodiment of the present invention disclosed herein. Moreover, common receive module 208 (as described in related disclosure entitled COMMON RECEIVE MODULE FOR A PROGRAMMABLE DIGITAL RADIO, previously mentioned) and common transmit module 204 (as described in related disclosure entitled COMMON TRANSMIT MODULE FOR A PROGRAMMABLE DIGITAL RADIO, previously mentioned) include numerous filters and switches. Alternate partitioning of these filters and switches between common receive module 208 and common transmit module 204 and AIU 308 would be obvious to those skilled in the art in order to reduce overall system hardware for some applications.

Although a few preferred embodiments of the invention have been shown and described, it will be appreciated by those skilled in the art that changes may be made in these embodiments, without departing from the principles and the spirit of the invention, the scope of which is defined in the claims and their equivalents.

What is claimed is:

1. A radio system including an antenna interface unit providing fault-tolerant connectivity between a plurality of receivers and a plurality of transmitters to an antenna, the antenna interface unit comprising:

a substantially zero failure rate power combiner/splitter including a plurality of inputs and an output, said output being connected to the antenna;

a plurality of fault tolerant transmit/receive (T/R) circuit elements connected to said inputs of the power combiner splitter;

a plurality of receive channels corresponding to the plurality of receivers connected to the power combiner/splitter via said T/R circuit elements, the receivers thereby being connectable to the antenna via respective receive channels of said plurality of receive channels, through the substantially zero failure rate power combiner/splitter, and the fault tolerant T/R circuit elements; and a plurality of transmit channels corresponding to the plurality of transmitters also connected to the power combiner/splitter via said T/R circuit elements, said transmit channels being different channels from each of the receive channels, the transmitters being connectable to the antenna via respective transmit channels of said plurality of transmit channels, through the substantially zero failure rate RF power combiner/splitter and the fault tolerant switching means.

2. An antenna interface unit as in claim 1, wherein the fault tolerant T/R circuit elements comprise transmit/receive (T/R) switches, duplexers or circulators.

3. An antenna interface unit as in claim 1 and further comprising:
   a substantially zero failure rate transmit signal power combiner connected to said plurality of transmitters, receiving signals transmitted by said transmitters and producing a combined transmit signal;
   a substantially zero failure rate transmit signal power splitter connected to the transmit signal power combiner, receiving the combined transmit signal produced thereby and producing a plurality of split transmit signals at least equal in number to said plurality of transmit channels; and,
   signal summers connected between said transmit signal power splitter and said fault tolerant T/R circuit elements and producing summed signals thereby, said summed signals being thereafter fed to said switching means.

4. An antenna interface unit as in claim 3 wherein the plurality of split transmit signals is at least twice the number of transmit channels and applied in pairs of split transmit signals to said signal summers.

5. An antenna interface unit as in claim 4 and wherein the combined transmit signal produced by the transmit signal power combiner is phase and amplitude matched with a combined transmit signal produced by and appearing at the output of said power combiner/splitter.

6. A fault tolerant antenna interface unit for selectively connecting multiple RF receivers and multiple RF transmitters to a common antenna, comprising:
   a substantially zero failure rate unitary RF power combiner/splitter having a plurality of inputs and an output connectable to the antenna;
   a plurality of transmit/receive channels connected to said plurality of inputs of the unitary RF power combiner/splitter;
   a respective plurality of fault tolerant circuit means connected to the plurality of transmit/receive channels for coupling transmit RF signals and receive RF signal to and from said unitary RF power combiner/splitter;
   a plurality of receive channels, respectively corresponding to a respective plurality of RF receivers connected to said fault tolerant circuit means for coupling, said RF receivers thereby being connectable to the antenna via said plurality of transmit/receive channels and through said unitary RF power combiner/splitter;
   a plurality of transmit channels, respectively corresponding to a respective plurality of RF transmitters connected to said fault tolerant circuit means for coupling, and including,
   a substantially zero failure rate transmit signal RF power combiner including a plurality of inputs respectively connected to the transmitters, receiving signals transmitted by said transmitters via said plurality of inputs and producing a corresponding combined transmit signal,
   a plurality of split RF transmit signal paths,
   a substantially zero failure rate transmit signal RF power splitter connected between the transmit signal RF power combiner and the split RF transmit signal paths, receiving the combined transmit signal produced by the transmit signal RF power combiner and producing split transmit signals for said split RF transmit signal paths,
   a plurality of summed RF transmit signal paths equal in number to the number of transmit channels,
   a plurality of RF transmit signal summers equal in number to said summed RF transmit signal paths connected between the split RF transmit signal paths and the summed RF transmit signal paths, and producing and feeding summed RF transmit signals to the circuit means for coupling and then to said unitary RF power combiner/splitter via said summed RF transmit signal paths and said transmit/receive channels, respectively.

7. A fault tolerant antenna interface unit as in claim 6 and further comprising:
   another substantially zero failure rate transmit signal RF signal power combiner connected to said plurality of signal summers and producing another combined transmit signal; and
   another substantially zero failure rate transmit signal RF power splitter connected between said fault tolerant circuit means for coupling and said another transmit RF signal power combiner;
   said substantially zero failure rate transmit signal RF power splitter, said split RF transmit signal paths, said signal summers, and said another substantially zero failure rate transmit signal RF power combiner comprising components of a fault tolerant power amplifier.

8. An antenna interface unit as in claim 7, wherein when said transmitters are transmitting, said another combined transmit signal produced by said another transmit signal RF power combiner connected to said signal summers is phase and amplitude matched with said combined transmit signal produced by said transmit signal RF power combiner connected to the transmitters.

9. An antenna interface unit as in claim 8, wherein when said transmitters are transmitting, said another combined transmit signal is phase and amplitude matched with transmit signals output to said antenna by unitary RF power combiner/splitter.

10. An antenna interface unit according to claim 6, and further comprising:
    a substantially zero failure rate receive signal RF power combiner connected to said receive channels and being responsive to split receive signals produced by said unitary RF power combiner/splitter, when receivers are receiving, for producing a combined receive RF signal at an output terminal thereof.

11. An antenna interface unit according to claim 10 wherein said combined receive signal at said output terminal is phase and amplitude matched with the split receive signals produced by said unitary RF power combiner/splitter.

12. An antenna interface unit according to claim 10 and additionally including a substantially zero failure rate receive signal RF power splitter located externally of the antenna interface unit and being connected to said output terminal of said substantially zero failure rate receive RF signal power combiner for producing individual receive signals which are respectively connected to said plurality of receivers.

13. An antenna interface unit as in claim 6 and further comprising:
    another substantially zero failure rate transmit signal RF power combiner connected to said plurality of signal summers and producing an intermediate combined transmit signal;
    another substantially zero failure rate transmit signal RF power splitter connected between said another transmit signal power combiner and said circuit means for coupling for producing a plurality of intermediate split transmit signals coupled to said unitary RF power combiner during a transmit mode of operation;
    a substantially zero failure rate receive signal RF power combiner, connected to said unitary RF power combiner/splitter via said circuit means for coupling, for producing an intermediate combined receive during a receive mode of operation; and a substantially zero failure rate receive signal RF power splitter connected to said receive signal RF power combiner for producing individual receive signal respectively connected to said plurality of receivers.

14. An antenna interface unit as in claim 6 wherein said fault tolerant circuit means for coupling the transmit and receive signals to and from the antenna via said power combiner/splitter includes T/R switches, duplexers and circulators.

15. An antenna interface unit as in claim 6 wherein each receive channel includes a band pass filter, an automatic gain control circuit and a low noise amplifier.

16. A fault tolerant power amplifier having fault tolerant T/R switching in an antenna interface unit which connects multiple receivers and multiple transmitters to an antenna, the receivers being connected to the amplifier through respectively corresponding receive signal channels and the transmitter being connected to the amplifier through a substantially zero failure rate transmit signal RF power combiner, the amplifier comprising:

a plurality of common transmit/receive signal channels at least equal in number to the number of receive signal channels;

a plurality of transmit channels;

a substantially zero failure rate transmit signal RF power splitter connected to the transmit signal RF power combiner, receiving a combined transmit signal from said RF power combiner and producing a plurality of split transmit signals which are coupled to said plurality of transmit channels;

a substantially zero failure rate RF power combiner/splitter connectable to the antenna and said common input/output signal channels, and respective fault tolerant T/R switching means equal in number to the number of receive signal channels and the number of said common input/output signal channels, each said fault tolerant T/R switching means being connected to a respective receive signal channel, a respective common input/output signal channel and a respective transmit signal channel, and selectively allowing either the corresponding receive signal channel to receive signals from the antenna via the RF power combiner/splitter or the corresponding transmit signal channel to transmit signals to the antenna via the RF power combiner/splitter.

17. A fault tolerant power amplifier as in claim 16 and further comprising:

a plurality of transmit signal sub-channels greater in number than said plurality of transmit signal channels located between the transmit signal RF power splitter and the transmit channels for coupling the split transmit signals to the transmit channels via signal summers, and a plurality of signal summers, equal in number to the transmit signal channels and the receive signal channels, connected between said transmit signal channels and the transmit signal sub-channels and receiving the split transmit signals from the transmit sub-channels and producing summed transmit signals applied to the transmit channels, said fault tolerant T/R switching means allowing either the corresponding receive channel to receive RF signals from the antenna via the RF power combiner/splitter or the corresponding transmit channel to transmit RF signals to the antenna via the RF power combiner/splitter.

18. An amplifier as in claim 17 wherein said transmit signal sub-channels are connected in pairs to respective ones of said plurality of signal summers.

* * * * *